United States Patent
Ha et al.

(10) Patent No.: US 11,555,914 B2
(45) Date of Patent: Jan. 17, 2023

(54) COMPACT INTEGRATED APPARATUS OF INTERFEROMETRIC RADAR ALTIMETER AND RADAR ALTIMETER CAPABLE OF PERFORMING INDIVIDUAL MISSIONS BY ALTITUDE AND OPERATING METHOD THEREOF

(71) Applicant: AGENCY FOR DEFENSE DEVELOPMENT, Daejeon (KR)

(72) Inventors: Jong Soo Ha, Daejeon (KR); Soo Ji Lee, Daejeon (KR); Seok Woo Lee, Daejeon (KR); Jong Hun Jang, Daejeon (KR); Han Jin Lee, Daejeon (KR); Young Sik Park, Daejeon (KR); Jin Eep Roh, Daejeon (KR); Wan Joo Kim, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 17/661,732

(22) Filed: May 2, 2022

(65) Prior Publication Data

US 2022/0365202 A1 Nov. 17, 2022

(30) Foreign Application Priority Data

May 4, 2021 (KR) .................. 10-2021-0057984

(51) Int. Cl.
   *G01S 13/88* (2006.01)
   *G01S 7/40* (2006.01)
   (Continued)

(52) U.S. Cl.
   CPC .......... *G01S 13/882* (2013.01); *G01S 7/4013* (2021.05); *G01S 13/103* (2013.01); *G01S 13/282* (2013.01); *G01S 13/32* (2013.01); *G01S 7/028* (2021.05)

(58) Field of Classification Search
   CPC .... G01S 13/882; G01S 7/4013; G01S 13/103; G01S 13/282; G01S 13/32; G01S 7/028
   (Continued)

(56) References Cited

U.S. PATENT DOCUMENTS

| 7,295,151 | B2 | 11/2007 | Vacanti |
| 10,036,807 | B2 | 7/2018 | Lim et al. |

(Continued)

FOREIGN PATENT DOCUMENTS

| JP | 2001-091635 A | 4/2001 |
| KR | 10-1289315 B | 7/2013 |

(Continued)

OTHER PUBLICATIONS

Notice of Grounds for Rejection in Korea Patent Application 10-2021-0057984 (dated Jun. 17, 2021).

(Continued)

*Primary Examiner* — Vladimir Magloire
*Assistant Examiner* — Alexander L. Syrkin
(74) *Attorney, Agent, or Firm* — Finch & Maloney PLLC

(57) ABSTRACT

Disclosed is a compact integrated apparatus of an interferometric radar altimeter (IRA) and a radar altimeter (RA) capable of performing individual missions by altitude, which includes: a plurality of antennas; a signal processing control unit selecting an RA mode at a low altitude and selecting an IRA mode at a high altitude based on a mode threshold and selecting an FMCW waveform at the low altitude and selecting an FM pulse waveform at the high altitude based on a waveform threshold; and a transceiving unit transmitting a signal by a first antenna positioned at an outermost portion among the plurality of antennas and receiving a signal by an nth antenna positioned at another outermost portion among the plurality of antennas in the RA mode and transmitting a signal through the first antenna and (Continued)

receiving signals through the plurality of antennas in the IRA mode.

14 Claims, 7 Drawing Sheets

(51) Int. Cl.
*G01S 13/10* (2006.01)
*G01S 13/32* (2006.01)
*G01S 13/28* (2006.01)
*G01S 7/02* (2006.01)

(58) Field of Classification Search
USPC .......................................................... 342/29
See application file for complete search history.

(56) References Cited

U.S. PATENT DOCUMENTS

| | | | |
|---|---|---|---|
| 10,310,070 B2 | 6/2019 | Lim et al. | |
| 2006/0044182 A1* | 3/2006 | Vacanti | G01S 7/35 |
| | | | 342/120 |
| 2012/0146841 A1* | 6/2012 | Ookawa | H01Q 3/36 |
| | | | 342/372 |
| 2016/0069994 A1* | 3/2016 | Allen | G01S 13/4454 |
| | | | 342/29 |
| 2017/0227635 A1* | 8/2017 | Lys | G01S 13/32 |
| 2019/0086534 A1* | 3/2019 | Frick | G01S 13/582 |
| 2020/0025571 A1* | 1/2020 | Skilton | G01C 21/1652 |

FOREIGN PATENT DOCUMENTS

| | | | | |
|---|---|---|---|---|
| KR | 10-1318882 B | | 10/2013 | |
| KR | 1318882 B1 * | | 10/2013 | |
| KR | 10-1336015 B | | 12/2013 | |
| KR | 10-1387664 B | | 4/2014 | |
| KR | 20150100051 A * | | 11/2015 | G01S 13/08 |
| KR | 10-2016-0107819 A | | 9/2016 | |
| KR | 10-2017-0058741 A | | 5/2017 | |
| KR | 10-2053203 B | | 12/2019 | |
| WO | WO-2006024008 A2 * | | 3/2006 | G01S 13/882 |

OTHER PUBLICATIONS

Notice of Allowance in Korea Patent Application 10-2021-0057984 (dated Sep. 13, 2021).

* cited by examiner

COMPACT INTEGRATED APPARATUS OF INTERFEROMETRIC RADAR ALTIMETER AND RADAR ALTIMETER CAPABLE OF PERFORMING INDIVIDUAL MISSIONS BY ALTITUDE AND OPERATING METHOD THEREOF

CROSS-REFERENCE TO RELATED APPLICATION

This application claims priority to and the benefit of Korean Patent Application No. 10-2021-0057984 filed in the Korean Intellectual Property Office on May 4, 2021, the entire contents of which are incorporated herein by reference.

BACKGROUND

(a) Field

Embodiments of the present invention relates to a compact integrated apparatus of an interferometric radar altimeter (IRA) and a radar altimeter (RA) capable of performing individual missions by altitude, which can perform missions in an interferometric radar altimeter mode and a radar altimeter mode by classifying missions by altitude, and an operating method thereof.

(b) Description of the Related Art

A radio frequency (RF) type integrated altimeter is required, which can plan a precise navigation of an airplane in an artificial or natural propagation disturbance situation, and perform a terrain contrast navigation mission and an altitude measurement mission for safe take-off and landing of the airplane in a weather environment under a bad condition. As apparatuses closest to the missions, an interferometric radar altimeter (hereinafter, referred to as IRA) which is a terrain contrast navigation sensor and a radar altimeter (hereinafter, referred to as RA) which is an altitude measurement sensor are provided.

The IRA measures a target distance from target reflection signals received by multiple (e.g., 3 or more) antennas and estimates a target angle from phase information of a target. The IRA may be operated in a pulse IRA scheme or a frequency modulated continuous wave (hereinafter, FMCW) IRA scheme.

The pulse IRA scheme is a scheme in which a continuous wave (hereinafter, referred to as CW) or an FMCW is generated, and converted into a pulse or an FM pulse by an amplifier again and transmitted with high power. The pulse IRA scheme has an advantage of being capable of detecting the target in a high-altitude section, but has a disadvantage of being incapable of performing the altitude measurement mission in a low-altitude section as large as a pulse width due to a blind zone which occurs due to a transmission/reception time difference.

The FMCW IRA scheme has an advantage of being capable of measuring the altitude even in the low-altitude section because the FMCW IRA scheme does not almost have the blind zone, but has a disadvantage in that it is difficult to operate the FMCW IRA scheme in the high-altitude section due to low transmission power as compared with the pulse IRA scheme.

Meanwhile, the pulse IRA scheme has an advantage that since transmission and reception operation time zones are different, it is possible to operate the pulse IRA scheme and the pulse IRA scheme is advantageous in terms of miniaturization even though an isolation level decreases due to narrow arrangement of a transmission antenna and a reception antenna. The FMCW IRA scheme has a limit that since the transmission antenna and the reception antenna simultaneously operate, an interval between the antennas should be increased in order to secure the isolation level, and has a disadvantage in terms of the miniaturization.

The RA measures the target distance from the target reflection signal received by the antenna, i.e., a terrain altitude. The RA is operated by the FMCW RA scheme, and has the same advantage and disadvantage as the FMCW IRA scheme.

The above information disclosed in this Background section is only for enhancement of understanding of the background of the invention, and therefore it may contain information that does not form the prior art that is already known in this country to a person of ordinary skill in the art.

SUMMARY

The IRA and the RA have definite advantages and disadvantages, and are different to integrate and miniaturize due to a design variable collision.

Embodiments of the present invention has been made in an effort to provide a compact integrated apparatus of an interferometric radar altimeter (IRA) and a radar altimeter (RA) capable of performing individual missions by an altimeter and an operating method thereof, which integrate and operate a pulse IRA, a pulse RA, and an FMCW RA.

An exemplary embodiment of the present invention provides a compact integrated apparatus of an interferometric radar altimeter (IRA) and a radar altimeter (RA) capable of performing individual missions by altitude, which includes: a plurality of antennas; a signal processing control unit selecting an RA mode at a low altitude and selecting an IRA mode at a high altitude based on a mode threshold and selecting an FMCW waveform at the low altitude and selecting an FM pulse waveform at the high altitude based on a waveform threshold; and a transceiving unit transmitting a signal by a first antenna positioned at an outermost portion among the plurality of antennas and receiving a signal by an nth antenna positioned at another outermost portion among the plurality of antennas in the RA mode and transmitting a signal through the first antenna and receiving signals through the plurality of antennas in the IRA mode.

The transceiving unit may transmit the FMCW waveform at the low altitude and transmit the FM pulse waveform at the high altitude based on the waveform threshold in the RA mode.

The transceiving unit may transmit the FM pulse waveform in the IRA mode.

The transceiving unit may vary sizes a frequency bandwidth and a pulse width according to an operation altitude at the low altitude based on the waveform threshold in the RA mode.

The transceiving unit may include a transmission unit converting a baseband signal transferred from the signal processing control unit into the FMCW waveform, a high power amplifier amplifying the FMCW waveform into the FM pulse waveform, a switching unit selectively transferring the FMCW waveform generated by the transmission unit to the high power amplifier or the first antenna, and a reception unit transferring target reflection signals received through the plurality of antennas to the signal processing control unit.

Another exemplary embodiment of the present invention provides a compact integrated apparatus of an interferometric radar altimeter (IRA) and a radar altimeter (RA) capable of performing individual missions by altitude, which includes: a first antenna transmitting an FMCW waveform or an FM pulse waveform in an RA mode at a low altitude based on a mode threshold and transmitting the FM pulse waveform in an IRA mode at a high altitude based on the mode threshold; a second antenna receiving a target reflection signal of the FM pulse in the IRA mode without receiving the target reflection signal in the RA mode; and a third antenna receiving the target reflection signal of the FMCW waveform or the FM pulse waveform in the RA mode and receiving the target reflection signal of the FM pulse in the IRA mode.

The first antenna and the third antenna may be positioned at an outermost portion.

Yet another exemplary embodiment of the present invention provides an operating method of a compact integrated apparatus of an interferometric radar altimeter (IRA) and a radar altimeter (RA) capable of performing individual missions by altitude, which includes: transmitting an FMCW waveform in the RA mode; transmitting an FM pulse waveform in the RA mode when an altitude becomes larger than a waveform threshold; and transmitting the FM pulse waveform in the IRA mode when the altitude is larger than a mode threshold when an operation mode is selected as an IRA mode.

When the altitude is not larger than the waveform threshold, the FMCW waveform may be transmitted in the RA mode.

When the altitude is not larger than the mode threshold, the RA mode may be operated as it is.

A signal may be transmitted by a first antenna positioned at an outermost portion among a plurality of antennas and a signal is received by an nth antenna positioned at another outermost portion among the plurality of antennas in the RA mode.

A signal may be transmitted through the first antenna and signals are received through the plurality of antennas in the IRA mode.

Sizes of a frequency bandwidth and a pulse width may be varied according to an operation altitude at a low altitude based on the waveform threshold in the RA mode.

The mode threshold may be larger than the waveform threshold.

A pulse IRA, a pulse RA, and an FMCW RA may be integrated and operated, and the transceiving unit and the antenna of each mode may be integrated and configured, and an integrated apparatus of the IRA and the RA may be minimized.

According to exemplary embodiments of the present invention, an integrated apparatus miniaturizes an IRA which is difficult to commercialize so far and integrates the miniaturized IRA with an existing RA to enable a precise navigation of an airplane even in an artificial or natural propagation disturbance situation and enable safe take-off and landing of the airplane even in a weather environment under a bad condition.

Further, the integrated apparatus can be operated in various altitudes and acquire good-quality target distance and angle information for various terrains as compared with the existing IRA or RA.

DETAILED DESCRIPTION

Hereinafter, exemplary embodiments of the present invention will be described more fully hereinafter with reference to the accompanying drawings so as to be easily implemented by those skilled in the art. The present invention may be implemented in various different forms and is not limited to exemplary embodiments described herein.

In order to clearly explain the present invention, parts irrelevant to the description are omitted, and the same reference sign is attached to the same or similar constituent elements throughout the specification.

In addition, unless explicitly described to the contrary, the word "comprise", and variations such as "comprises" or "comprising", will be understood to imply the inclusion of stated elements but not the exclusion of any other elements.

Figure 1:
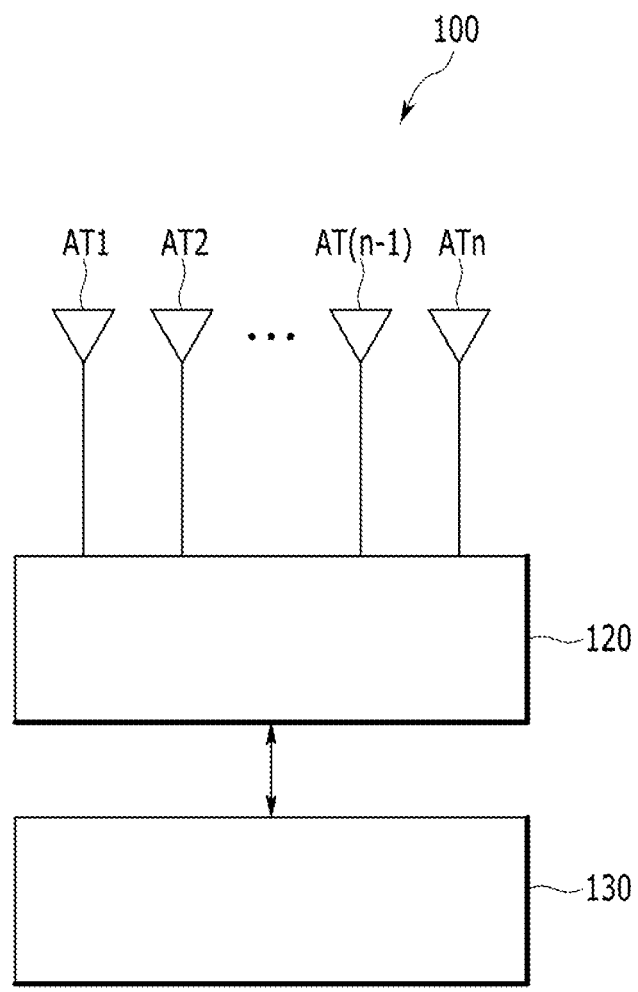
FIG. 1 is a block diagram illustrating a compact integrated apparatus of an interferometric radar altimeter (IRA) and a radar altimeter (RA) capable of performing individual missions by altitude according to an exemplary embodiment of the present invention.

FIG. 1 is a block diagram illustrating a compact integrated apparatus of an interferometric radar altimeter (IRA) and a radar altimeter (RA) capable of performing individual missions by altitude according to an exemplary embodiment of the present invention.

Referring to FIG. 1, a compact integrated apparatus 100 of an interferometric radar altimeter (IRA) and a radar altimeter (RA) capable of performing individual missions by altitude (hereinafter, simplified as 'compact integrated apparatus') includes a plurality of antennas AT1, AT2, ..., AT(n−1), ATn, a transceiving unit 120, and a signal processing control unit 130.

The plurality of antennas AT1, AT2, ..., AT(n−1), ATn may be arranged at a predetermined interval in one direction. That is, a first antenna AT1, a second antenna AT2, ..., an n−1$^{st}$ antenna AT(n−1), an nth antenna ATn may be arranged in order. Here, it is illustrated that the plurality of antennas AT1, AT2, ..., AT(n−1), ATn are arranged in one direction, but the present invention is not limited thereto, and the plurality of antennas AT1, AT2, . . . , AT(n−1), ATn may be distributed and arranged on a plane or in a space.

The first antenna AT1 and the nth antenna ATn may be positioned at an outermost portion among the plurality of antennas AT1, AT2, . . . , AT(n−1), ATn and the first antenna AT1 and the nth antenna ATn may be spaced apart from each other farthest. The first antenna AT1 may be a transmission/reception antenna for transmission and reception of a signal. The remaining antennas other than the first antenna AT1 may be reception antennas for reception of the signal.

The transceiving unit 120 converts a baseband signal generated by the signal processing control unit 130 into an FM pulse waveform and an FMCW waveform, and transmits the FM pulse waveform or the FMCW waveform through the first antenna AT1. The transceiving unit 120 may receive a target reflection signal of the FM pulse waveform through the plurality of antennas AT1, AT2, . . . , AT(n−1), ATn in an IRA mode, and convert the target reflection signal into the baseband signal and transfer the baseband signal to the signal processing control unit 130. The transceiving unit 120 may receive a target reflection signal of the FM pulse waveform or the FMCW waveform through the nth antenna ATn and not receive the target reflection signal through the remaining antennas AT1, AT2, . . . , AT(n−1) in an RA mode. A specific configuration of the transceiving unit 120 will be described below with reference to FIG. 2.

The signal processing control unit 130 generates the baseband signal and transfers the baseband signal to the transceiving unit 120. In addition, the signal processing control unit 130 selects one of the RA mode and the IRA mode as an operation mode according to the altitude, and controls the transceiving unit 120 by selecting one of the FM pulse waveform and the FMCW waveform as an operation waveform according to the altitude. The signal processing control unit 130 processes the baseband signal transferred from the transceiving unit 120 to measure a target distance, a target angle, the altitude, etc., and acquire terrain information. A method in which the signal processing control unit 130 selects the operation mode and the operation waveform according to the altitude will be described below with reference to FIG. 3.

Figure 2:
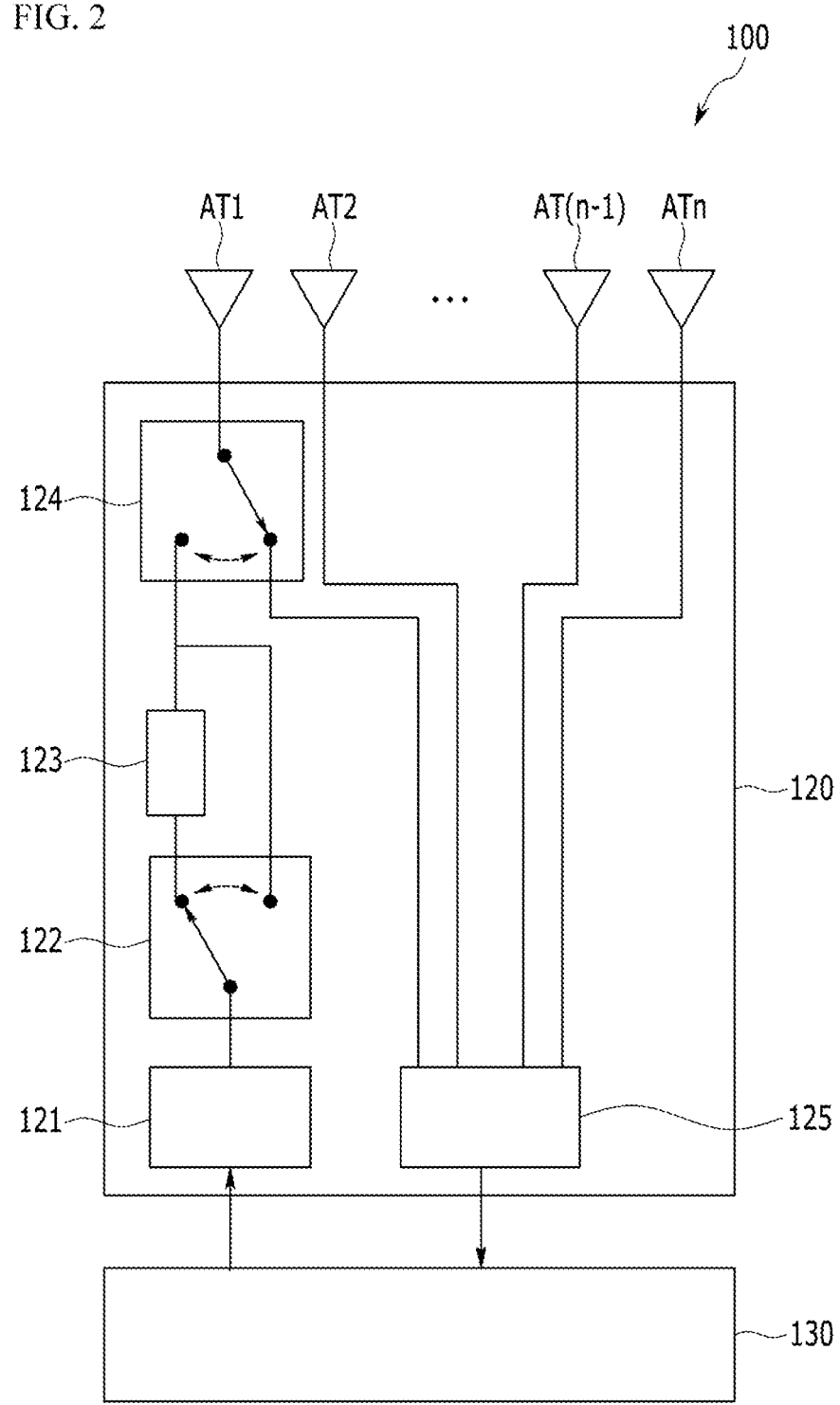
FIG. 2 is a block diagram more specifically illustrating a transceiving unit in the compact integrated apparatus of an interferometric radar altimeter (IRA) and a radar altimeter (RA) capable of performing individual missions by altitude according to an exemplary embodiment of the present invention.

FIG. 2 is a block diagram more specifically illustrating a transceiving unit in the compact integrated apparatus of an interferometric radar altimeter (IRA) and a radar altimeter (RA) capable of performing individual missions by altitude according to an exemplary embodiment of the present invention.

Referring to FIG. 2, the transceiving unit 120 may include a transmission unit 121, a first switching unit 122, a high power amplifier 123, a second switching unit 124, and a reception unit 125.

The transmission unit 121 may convert and output the baseband signal transferred from the signal processing control unit 130 into the FMCW waveform.

The first switching unit 122 may selectively transfer the FMCW waveform generated by the transmission unit 121 to the high power amplifier 123 or the second switching unit 124 (first antenna AT1) according to a control by the signal processing control unit 130. Specifically, when intending to output the FM pulse waveform through the first antenna AT1, the first switching unit 122 may transfer the FMCW waveform generated by the transmission unit 121 to the high power amplifier 123. When intending to output the FMCW waveform through the first antenna AT1, the first switching unit 122 may immediately transfer the FMCW waveform generated by the transmission unit 121 to the second switching unit 124.

The high power amplifier 123 amplifies the FMCW waveform generated by the transmission unit 121 to make the FM pulse waveform. The high power amplifier 123 may transfer the FM pulse waveform to the second switching unit 124.

The second switching unit 124 allows the first antenna AT1 to temporally separately function as the transmission antenna and the reception antenna. Specifically, according to the control by the signal processing control unit 130, the second switching unit 124 may connect the transmission unit 121 to the first antenna AT1 when transmitting the FMCW waveform or the FM pulse waveform through the first antenna AT1 and connect the first antenna AT1 to the reception unit 125 when receiving the target reflection signal through the first antenna AT1. That is, the second switching unit 124 may selectively connect the first antenna AT1 to the transmission unit 121 or the reception unit 125.

The reception unit 125 may convert the target reflection signal of the FM pulse waveform received through the plurality of antennas AT1, AT2, . . . , AT(n−1), ATn into the baseband signal and transfer the baseband signal to the signal processing control unit 130 in the IRA mode. In addition, the reception unit 125 may convert the target reflection signal of the FM pulse waveform or the target reflection signal of the FMCW waveform received through the nth antenna ATn into the baseband signal and transfer the baseband signal to the signal processing control unit 130 in the RA mode. That is, the reception unit 125 may selectively transfer the target reflection signals received through the plurality of antennas AT1, AT2, . . . , AT(n−1), ATn to the signal processing control unit 130 according to the operation mode.

Figure 3:
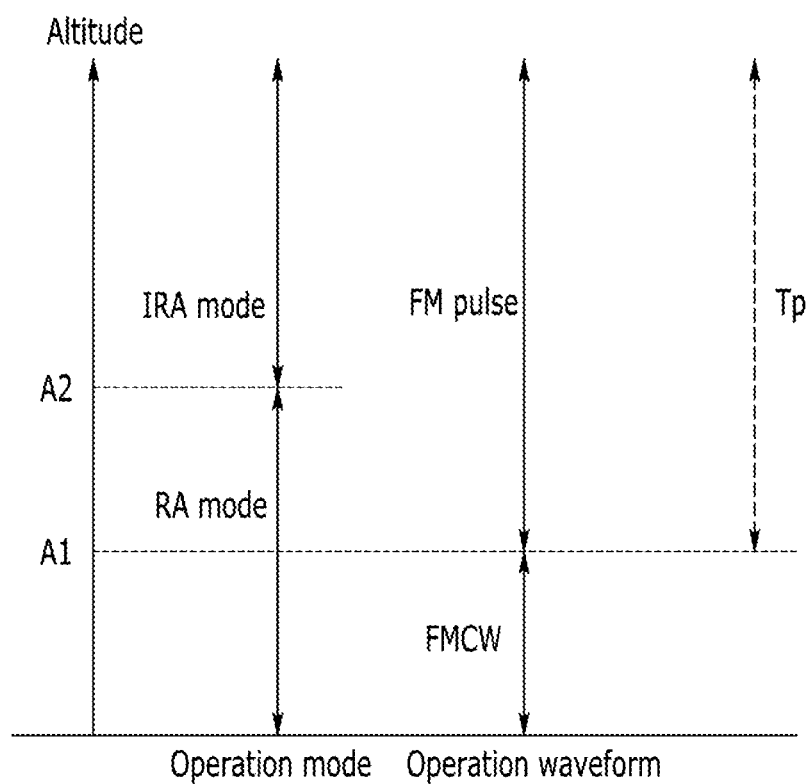
FIG. 3 is a conceptual diagram illustrating an operation mode and an operation waveform of the compact integrated apparatus of an interferometric radar altimeter (IRA) and a radar altimeter (RA) capable of performing individual missions by altitude according to an exemplary embodiment of the present invention.

FIG. 3 is a conceptual diagram illustrating an operation mode and an operation waveform of the compact integrated apparatus of an interferometric radar altimeter (IRA) and a radar altimeter (RA) capable of performing individual missions by altitude according to an exemplary embodiment of the present invention.

Referring to FIG. 3, the compact integrated apparatus 100 may classify the operation mode into the RA mode and the IRA mode based on a mode threshold A2 according to the altitude, and classify and operate the operation waveform into the FM pulse waveform and the FMCW waveform based on a waveform threshold A1 according to the altitude.

Specifically, the compact integrated apparatus 100 may be operated in the RA mode at a low altitude based on the mode threshold A2 and operated in the IRA mode at a high altitude based on the mode threshold A2. In addition, the compact integrated apparatus 100 may use the FMCW waveform at the low altitude based on the waveform threshold A1 and use the FM pulse waveform at the high altitude based on the waveform threshold A1. That is, the signal processing control unit 130 selects the RA mode at the low altitude and selects the IRA mode at the high altitude based on the mode threshold A2 and selects the FMCW waveform at the low altitude and selects the FM pulse waveform at the high altitude based on the waveform threshold A1.

The mode threshold A2 may be larger than the waveform threshold A1. As a result, the compact integrated apparatus 100 may use only the FM pulse waveform when operating in the IRA mode, and use the FMCW waveform at the low altitude and use the FM pulse waveform at the high altitude based on the waveform threshold A1 when operating in the RA mode. That is, the transceiving unit 120 may transmit the FMCW waveform at the low altitude and transmit the FM pulse waveform at the high altitude based on the waveform threshold A1 in the RA mode, and transmit the FM pulse waveform in the IRA mode.

Hereinafter, an FM pulse technique will be described.

In the FM pulse technique, a distance resolution ΔR may be designed by setting a frequency bandwidth B and a sampling frequency $f_s$ as in Equations 1 and 2.

$$\Delta R = \frac{c}{2B} \quad \text{(Equation 1)}$$

$$\Delta R = \frac{c \cdot T_p}{2B} \cdot \frac{f_s}{N_s} \quad \text{(Equation 2)}$$

Here, c represents a velocity of light, $N_s$ represents the number of processed data, and $T_p$ represents a pulse width.

In addition, a signal to noise ratio (hereinafter, referred to as SNR) of the target reflection signal may be expressed as in Equation 3.

$$SNR \propto \frac{N_s}{R^4}, \text{ (when } N_s \propto f_s \cdot T_p \text{)} \quad \text{(Equation 3)}$$

Here, R represents a target distance or altitude.

It may be known that the number of processed data, $N_s$ is in proportion to a multiplication of the sampling frequency $f_s$ and the pulse width $T_p$ in Equations 1 and 2. In addition, it may be known that the SNR of the target reflection signal is in proportion to the number of processed data, $N_s$ and in inverse portion to $R^4$ in Equation 3. When such a point is considered, it may be known that as the pulse width $T_p$ of the FM pulse is increased, a target may be detected even at a higher altitude.

A blind zone $R_b$ of the FM pulse may be expressed as in Equation 4.

$$R_b \propto \frac{c \cdot T_p}{2} \quad \text{(Equation 4)}$$

The blind zone $R_b$ of the FM pulse is in proportion to the pulse width $T_p$. When such a point is considered, it may be known that as the pulse width $T_p$ of the FM pulse is decreased, the target may be detected even at a lower altitude.

The compact integrated apparatus 100 according to the exemplary embodiment of the present invention may fixedly set or variably set the frequency bandwidth B and the sampling frequency $f_s$ according to design and operation conditions, and increase the pulse width $T_p$ when the operation altitude increases and decrease the pulse width $T_p$ when the operation altitude decreases, in using the FM pulse waveform. As a result, the compact integrated apparatus 100 may measure terrain altitude measurement at various altitudes by using the FM pulse waveform.

Next, an FMCW technique will be described.

An FMCW scheme should be designed so that a target distance frequency enters an intermediate frequency bandwidth $f_{r(max)}$ at a step before sampling, and the intermediate frequency bandwidth $f_{r(max)}$ may be set according to a section $R_{uab}$ capable of resolving distance ambiguity, and the frequency bandwidth B and the pulse width $T_p$ as in Equation 5.

$$f_{r(max)} = \frac{2 \cdot R_{uab}}{c} \cdot \frac{B}{T_p} \quad \text{(Equation 5)}$$

However, in order to satisfying a minimum detection distance and a maximum detection distance within the intermediate frequency bandwidth $f_{r(max)}$ in which a frequency cell size Δf (=$f_s/N_s$) corresponding to the distance resolution ΔR is limited, the frequency cell size Δf needs to be decreased, and sizes of the frequency bandwidth B and the pulse width $T_p$ need to be varied according to the operation altitude. However, in this method, when an altitude change is large, a change of the parameters becomes also larger, and as a result, altitude measurement performance may not be maintained to be constant.

Since the compact integrated apparatus 100 according to the exemplary embodiment of the present invention does not use only the FMCW waveform but use the FM pulse at the high altitude and uses the FMCW waveform at the low altitude based on the waveform threshold A1 in the RA mode, the transceiving unit 120 may decrease the frequency cell size Δf by a decimation technique only at the low altitude based on the waveform threshold A1, and vary the sizes of the frequency bandwidth B and the pulse width $T_p$ according to the operation altitude based on the waveform threshold A1 in the RA mode according to the control by the signal processing control unit 130.

A method for classifying the operation mode into the RA mode and the IRA mode based on the mode threshold A2 according to the altitude, and classifying and operating the operation waveform into the FM pulse waveform and the FMCW waveform based on the waveform threshold A1 according to the altitude may be implemented by integrating a part which generates the FM pulse waveform and a part which generates the FMCW waveform like the transceiving unit 120 described above in FIG. 2.

In other words, a low-power FMCW waveform generated by the transmission unit 121 may be transmitted as it is through the first antenna AT1 through the first switching unit 122 at the low altitude based on the waveform threshold A1 in the RA mode. In addition, the FMCW waveform generated by the transmission unit 121 may be transferred to the high power amplifier 123 through the first switching unit 122 and converted into the high-power FM pulse waveform, and transmitted through the first antenna AT1 at the high altitude of the RA mode and in the IRA mode.

Hereinafter, an integrated operation method of the antenna according to the operation mode and the operation waveform in the compact integrated apparatus 100 according to the exemplary embodiment of the present invention will be described by comparing the general IRA antenna and the RA antenna with reference to FIGS. 4 to 6.

Figure 4:
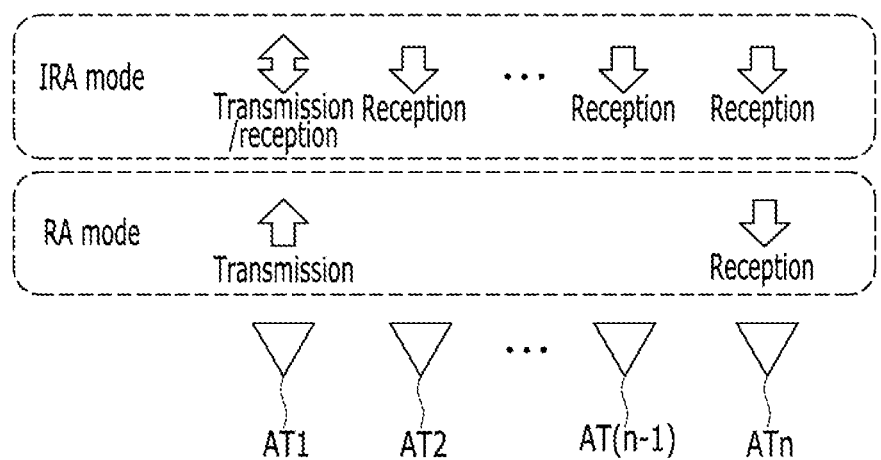
FIG. 4 is a conceptual diagram illustrating an integrated operation method of antennas according to the operation mode and the operation waveform in the compact integrated apparatus of an interferometric radar altimeter (IRA) and a radar altimeter (RA) capable of performing individual missions by altitude according to an exemplary embodiment of the present invention.
Figure 5:
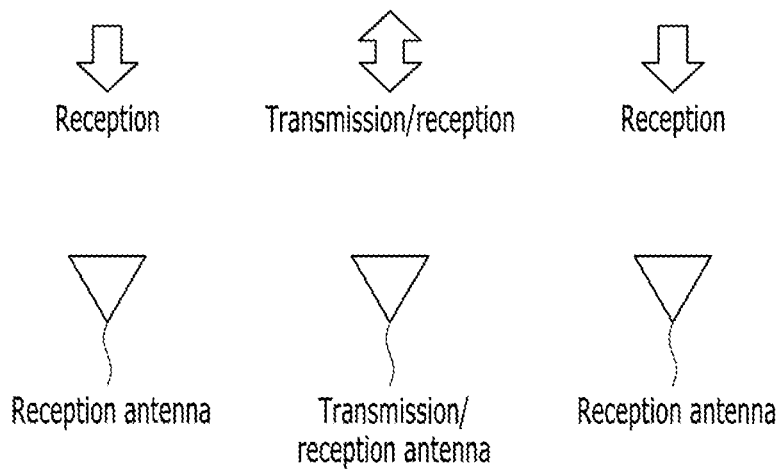
FIG. 5 is a conceptual diagram illustrating an antenna array and operation method of a general IRA.

FIG. 4 is a conceptual diagram illustrating an integrated operation method of antennas according to the operation mode and the operation waveform in the compact integrated apparatus of an interferometric radar altimeter (IRA) and a radar altimeter (RA) capable of performing individual missions by altitude according to an exemplary embodiment of the present invention. FIG. 5 is a conceptual diagram illustrating an antenna array and operation method of a general IRA. FIG. 6 is a conceptual diagram illustrating an antenna array and operation method of a general RA.

Referring to FIG. 4, the compact integrated apparatus 100 according to the exemplary embodiment of the present invention includes a plurality of antennas AT1, AT2, . . . , AT(n−1), ATn configured by a different scheme from the antenna configuration of the general IRA and RA in order to integrate the IRA and the RA while simultaneously achieving miniaturization and isolation level securing.

Specifically, the compact integrated apparatus 100 according to the exemplary embodiment of the present invention may include the plurality of antennas AT1, AT2, ..., AT(n–1), ATn arranged spaced apart from each other as described above in FIG. 1. The first antenna AT1 and the nth antenna ATn may be positioned at an outermost portion among the plurality of antennas AT1, AT2, ..., AT(n–1), ATn and the first antenna AT1 and the nth antenna ATn may be spaced apart from each other farthest, and the first antenna AT1 may be a transmission/reception antenna for transmission and reception of the signal. The remaining antennas other than the first antenna AT1 may be reception antennas for reception of the signal. That is, in a situation in which the plurality of antennas AT1, AT2, ..., AT(n–1), ATn cannot but be arranged on an integrated plate in order to secure a baseline interval of the IRA mode, the first antenna AT1 and the nth antenna ATn positioned at the outermost portion among three or more antennas AT1, AT2, ..., AT(n–1), ATn may be used as the transmission antenna and the reception antenna in the RA mode in order to integrate and arrange the transmission antenna and the reception antenna in the RA mode. In addition, the first antenna AT1 positioned at the outermost portion may be used as the transmission antenna and all antennas AT1, AT2, ..., AT(n–1), ATn may be used as the reception antenna in the IRA mode.

In the general IRA, the target angle is estimated by comparing a phase difference between the antennas according to the baseline interval, and target information is acquired by using three or more reception antennas in order to resolve the angle ambiguity and the target angle is estimated based thereon. In this case, an antenna positioned at the center is used as the transmission/reception antenna as illustrated in FIG. 5 due to convenience of a hardware configuration such as a transmission/reception line, an antenna isolation level, etc. That is, in the general IRA, a scheme in which all antennas simultaneously receive the target reflection signal after transmitting the pulse in a central antenna is used, and to this end, a scheme of arranging the antennas on the integrated plate is used.

Figure 6:
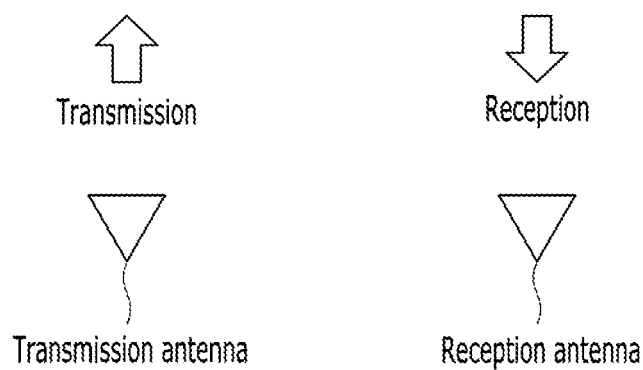
FIG. 6 is a conceptual diagram illustrating an antenna array and operation method of a general RA.

In the general FMCW RA, the continuous wave is transmitted and received by one transmission antenna and one reception antenna to measure the target distance as illustrated in FIG. 6. In this case, since an interval between the transmission antenna and the reception antenna should be widened as possible in order to solve an isolation level decrease problem due to radiation of the continuous wave, a scheme of separately manufacturing, and separating and arranging the transmission antenna and the reception antenna is used.

As such, since arrangement locations of the transmission antenna and the reception antenna are different in the general IRA and FMCW RA, miniaturization is difficult in integrating and configuring the antenna of the RA and the antenna of the FMCW RA.

However, the compact integrated apparatus 100 according to the exemplary embodiment of the present invention miniaturizes the IRA which is difficult to commercialize so far and integrates the IRA with the RA to enable a precise navigation of the airplane even in the artificial or natural propagation disturbance situation, and enable safe take-off and landing of the airplane even in a weather environment under a bad condition, and may be operated at various altitudes and acquire good-quality target distance and angle information for various terrains as compared with the existing IRA or RA.

Hereinafter, an operating method of the compact integrated apparatus according to an exemplary embodiment of the present invention will be described with reference to FIG. 7.

Figure 7:
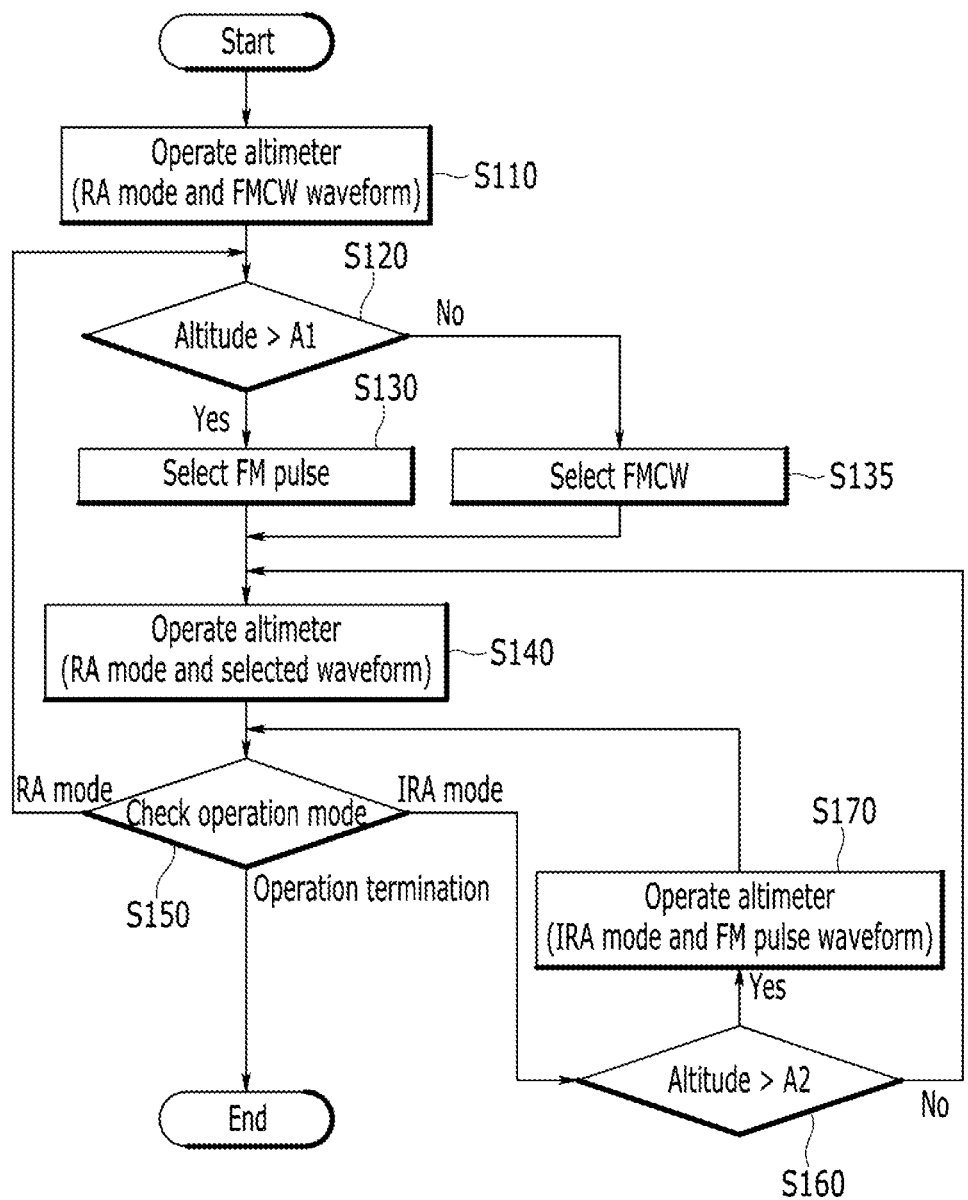
FIG. 7 is a flowchart illustrating an operating method of the compact integrated apparatus of an interferometric radar altimeter (IRA) and a radar altimeter (RA) capable of performing individual missions by altitude according to an exemplary embodiment of the present invention.

FIG. 7 is a flowchart illustrating an operating method of the compact integrated apparatus of an interferometric radar altimeter (IRA) and a radar altimeter (RA) capable of performing individual missions by altitude according to an exemplary embodiment of the present invention.

Referring to FIG. 7, the corn pact integrated apparatus 100 starts an altimeter operation when an airplane takes off (S110). In this case, the compact integrated apparatus 100 starts an operation in an RA mode and an FMCW waveform. The compact integrated apparatus 100 transmits the FMCW waveform through a first antenna AT1 in the RA mode receives a target reflection signal of the FMCW waveform through an nth antenna ATn to perform altitude measurement, target distance measurement, etc.

The compact integrated apparatus 100 checks whether an altitude is larger than a waveform threshold A1 during the altimeter operation (S120).

The compact integrated apparatus 100 selects an FM pulse as a used waveform when the altitude becomes larger than the waveform threshold A1 (S130) and selects the FMCW as the used waveform when the altitude is not larger than the waveform threshold A1 (S135). The compact integrated apparatus 100 operates the altimeter by transmitting an FM pulse waveform through the first antenna AT1 in the RA mode when the FM pulse is selected. The compact integrated apparatus 100 receives the target reflection signal of the FM pulse waveform through the nth antenna ATn to perform the altitude measurement, the target distance measurement, etc.

The compact integrated apparatus 100 may operate the altimeter by using the FM pulse waveform or the FMCW waveform selected according to the altitude while operating in the RA mode (S140).

The compact integrated apparatus 100 checks whether the operation mode is selected as the IRA mode or whether the operation mode is continued as the RA mode, or whether the operation is terminated while operating the altimeter (S150).

When the operation mode is selected as the IRA mode, the compact integrated apparatus 100 checks whether the altitude is larger than a mode threshold A2 (S160), and operates the operation mode as the RA mode as it is when the altitude is not larger than the mode threshold A2, and changes the operation mode to the altimeter to the IRA mode and uses the FM pulse waveform when the altitude is larger than the mode threshold A2 (S170). The compact integrated apparatus 100 transmits the FM pulse waveform through the first antenna AT1 when operating the IRA mode and receives a target reflection signal of the FM pulse waveform through all antennas AT1, AT2, ..., AT(n–1), ATn to perform the altitude measurement, the target distance measurement, etc.

The compact integrated apparatus 100 checks the operation mode, and perform the altitude measurement, the target distance measurement, etc., by using the FM pulse waveform or the FMCW waveform according to the altitude based on the waveform threshold A1 when the operation mode is continuously selected as the RA mode. In addition, the compact integrated apparatus 100 checks the operation mode, and terminates the altimeter operation when the operation termination is selected.

The drawings referred and the detailed description of the present invention disclosed up to now are just used for exemplifying the present invention and they are just used for the purpose of describing the present invention, but not used for limiting a meaning or restricting the scope of the present invention disclosed in the claims. Therefore, it will be appreciated by those skilled in the art that various modifications and other exemplary embodiments equivalent thereto can be made therefrom. Accordingly, the true technical scope of the present invention should be defined by the technical spirit of the appended claims.

What is claimed is:

1. A compact integrated apparatus of an interferometric radar altimeter (IRA) and a radar altimeter (RA) capable of performing individual missions by altitude, the apparatus comprising:
    a plurality of antennas;
    a signal processing control unit selecting an RA mode at a low altitude and selecting an IRA mode at a high altitude based on a mode threshold and selecting an FMCW waveform at the low altitude and selecting an FM pulse waveform at the high altitude based on a waveform threshold; and
    a transceiving unit transmitting a signal by a first end antenna positioned at a first outermost portion among the plurality of antennas and receiving a signal by a second end antenna positioned at a second outermost portion among the plurality of antennas in the RA mode and transmitting a signal through the first end antenna and receiving reflected signals through the plurality of antennas in the IRA mode.

2. The apparatus of claim 1, wherein: the transceiving unit transmits the FMCW waveform at the low altitude and transmits the FM pulse waveform at the high altitude based on the waveform threshold in the RA mode.

3. The apparatus of claim 2, wherein: the transceiving unit transmits the FM pulse waveform in the IRA mode.

4. The apparatus of claim 2, wherein: the transceiving unit varies a frequency bandwidth and a pulse width according to an operation altitude at the low altitude based on the waveform threshold in the RA mode.

5. The apparatus of claim 1, wherein: the transceiving unit includes,
    a transmission unit converting a baseband signal transferred from the signal processing control unit into the FMCW waveform,
    a high power amplifier amplifying the FMCW waveform into the FM pulse waveform,
    a switch selectively transferring the FMCW waveform generated by the transmission unit to the high power amplifier or the first end antenna, and
    a reception unit transferring the reflected signals received through the plurality of antennas to the signal processing control unit.

6. A compact integrated apparatus of an interferometric radar altimeter (IRA) and a radar altimeter (RA) capable of performing individual missions by altitude, the apparatus comprising:
    a first antenna transmitting an FMCW waveform or an FM pulse waveform in an RA mode at a low altitude based on a mode threshold and transmitting the FM pulse waveform in an IRA mode at a high altitude based on the mode threshold;
    a second antenna receiving a target reflection signal of the FM pulse waveform in the IRA mode without receiving the target reflection signal in the RA mode; and
    a third antenna receiving the target reflection signal of the FMCW waveform or the FM pulse waveform in the RA mode and receiving the target reflection signal of the FM pulse waveform in the IRA mode.

7. The apparatus of claim 6, wherein: the second antenna is positioned between the first antenna and the third antenna.

8. An operating method of a compact integrated apparatus of an interferometric radar altimeter (IRA) and a radar altimeter (RA) capable of performing individual missions by altitude, the method comprising:
    transmitting an FMCW waveform in an RA mode;
    transmitting an FM pulse waveform in the RA mode when an altitude becomes larger than a waveform threshold; and
    transmitting the FM pulse waveform in an IRA mode when the altitude is larger than a mode threshold when an operation mode is selected as an IRA mode.

9. The method of claim 8, wherein: when the altitude is not larger than the waveform threshold, the FMCW waveform is transmitted in the RA mode.

10. The method of claim 8, wherein: when the altitude is not larger than the mode threshold, the RA mode is operated as it is.

11. The method of claim 8, wherein: a signal is transmitted by a first antenna positioned at an outermost portion among a plurality of antennas and a reflected signal is received by an nth antenna positioned at another outermost portion among the plurality of antennas in the RA mode.

12. The method of claim 11, wherein the reflected signal is received through the plurality of antennas in the IRA mode.

13. The method of claim 8, wherein a frequency bandwidth and a pulse width are varied according to an operation altitude at a low altitude based on the waveform threshold in the RA mode.

14. The apparatus of claim 1, wherein:
    the plurality of antennas includes the first end antenna, the second end antenna, and one or more intermediate antennas positioned between the first and second end antennas;
    the signal processing control unit (a) selects the RA mode by receiving the reflected signals through only the second end antenna and (b) selects the IRA mode by receiving the reflected signals through the plurality of antennas;
    the signal processing control unit (a) selects the FMCW waveform by providing the FMCW waveform to the first end antenna and (b) selects the FM pulse waveform by providing the FMCW waveform to an amplifier;
    the transceiving unit transmits the FMCW or FM pulse waveform through the first end antenna; and
    the transceiving unit receives the reflected signals through (a) only the second end antenna in the RA mode, and (b) the plurality of antennas in the IRA mode.

* * * * *